W. F. FOLMER.
FOCUSING HOOD FOR CAMERAS.
APPLICATION FILED SEPT. 14, 1910.
1,060,834.
Patented May 6, 1913.
2 SHEETS—SHEET 1.
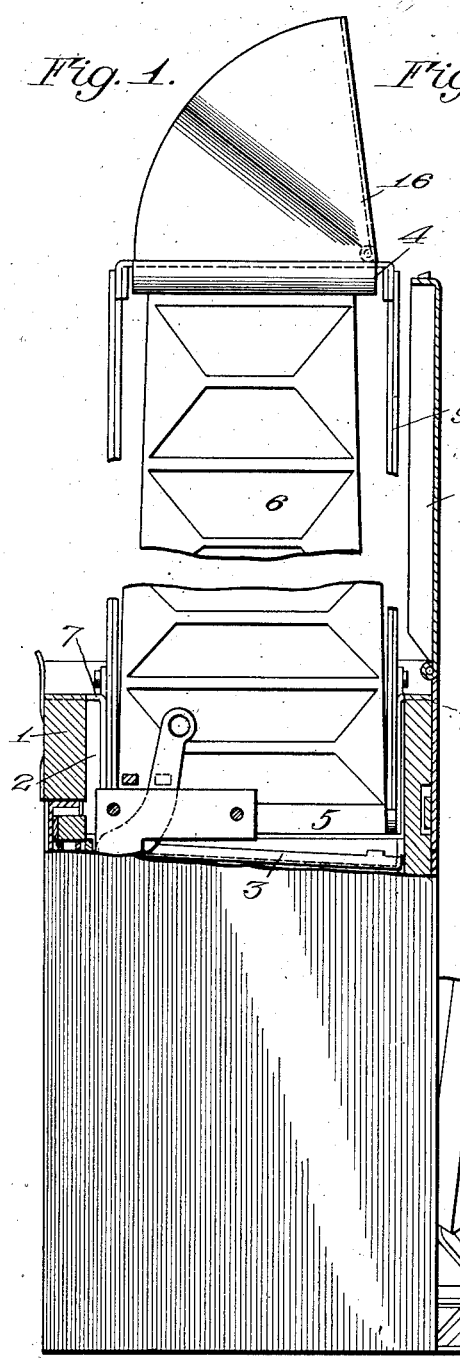
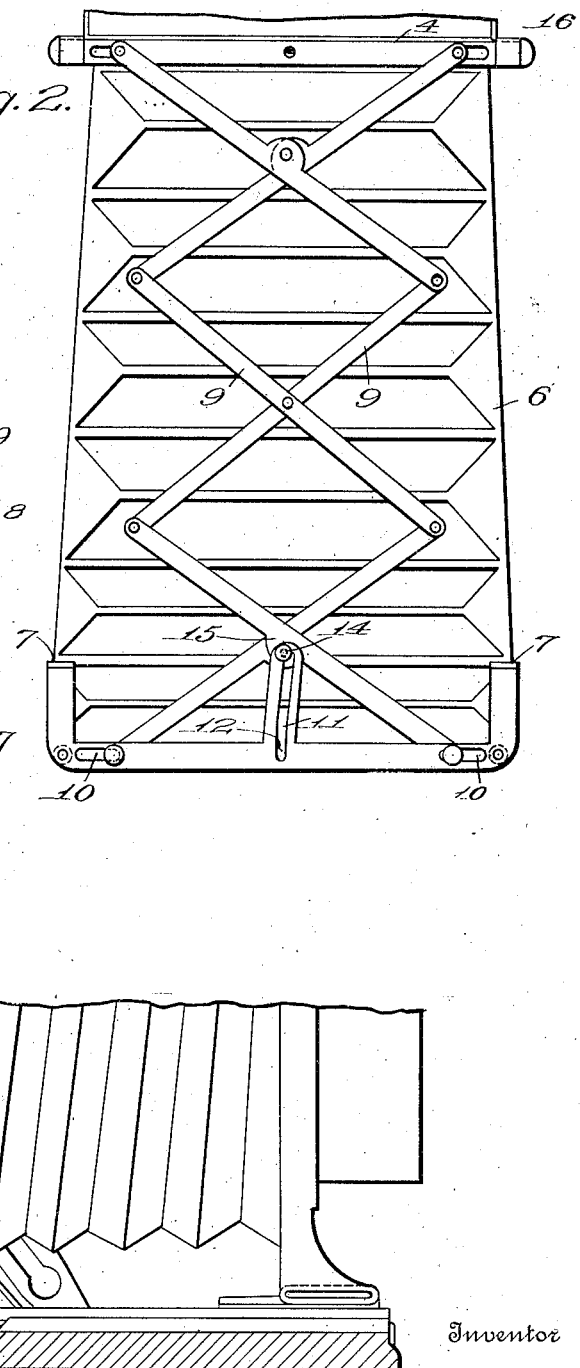
Witnesses
Inventor
William F. Folmer W. F. FOLMER.
FOCUSING HOOD FOR CAMERAS.
APPLICATION FILED SEPT. 14, 1910.
1,060,834.
Patented May 6, 1913.
2 SHEETS—SHEET 2.
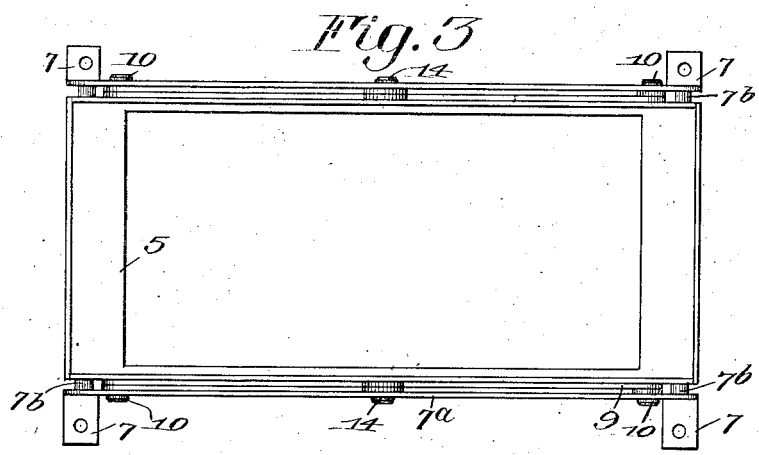
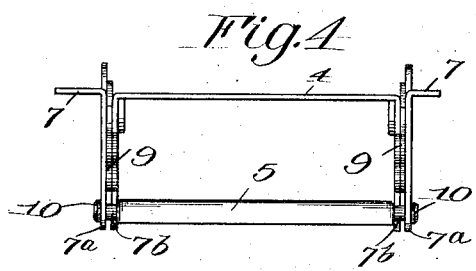
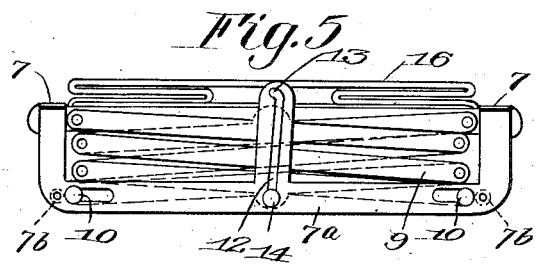
Witnesses
Inventor
William F. Folmer
By
his Attorneys

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

FOCUSING-HOOD FOR CAMERAS.

1,060,834.   Specification of Letters Patent.   Patented May 6, 1913.

Original application filed March 26, 1909, Serial No. 485,912. Divided and this application filed September 14, 1910. Serial No. 581,987.

*To all whom it may concern:*

Be it known that I, WILLIAM F. FOLMER, of Rochester, in the county of Monroe and State of New York, have invented certain new and useful Improvements in Focusing-Hoods for Cameras; and I do hereby declare the following to be a full, clear, and exact description of the same, reference being had to the accompanying drawings, forming a part of this specification, and to the reference-numerals marked thereon.

My present invention relates to photography and it has for its object to provide a simple, neat and efficient focusing hood for use in connection with cameras or other instruments embodying focusing screens, the improvements being directed more particularly toward the means employed for supporting a collapsible hood in its extended or operative position.

Another object of the invention is to provide a construction which will be light and compact and yet strong and durable.

To these and other ends the invention consists in certain improvements and combinations of parts all as will be hereinafter more fully described, the novel features being pointed out in the claims at the end of the specification.

In the drawings: Figure 1 is a side elevation of a camera provided with a focusing hood constructed in accordance with and illustrating one embodiment of my invention, parts of the camera body being broken away to clearly illustrate the hood; Fig. 2 is a front elevation of the hood detached and in extended position; Fig. 3 is a bottom plan view of the hood with the collapsible bellows detached; Fig. 4 is an end elevation of the same parts in collapsed position, and Fig. 5 is a side view of the complete hood collapsed.

Similar reference numerals throughout the several figures indicate the same parts.

I have, in the present instance, shown my improvements in connection with a camera of the type disclosed in my prior pending application filed March 26, 1909, Serial No. 485,912, of which this is a division, such camera comprising, so far as concerns this invention, a box or body 1 having a focusing well or chamber 2 at its top separated from the interior exposure chamber by a ground glass or other focusing screen 3 upon which the image cast by the lens is reflected by a suitable means (not shown).

In conjunction with the focusing screen, I provide a focusing hood, the body of which is constructed, in the present instance, of opposite outer and inner frame pieces 4 and 5 connected by an intermediate collapsible bellows 6. The lower or inner frame piece 5 is supported upon stirrup straps or hangers 7 that, in the present instance, are formed integral with each other from a plate 7ᵃ in pairs on opposite sides of the frame and connected in spaced relationship to the adjacent side of the latter in each instance by studs 7ᵇ. The hangers engage over the edges of the walls of the focusing well 2 and position the hood therein above the ground glass 3 but render the hood a separate and, if desired, detachable unit. The opposite end frames 4 and 5 are connected for relative movement in a manner permitting the hood to be collapsed or folded within the focusing well beneath a suitable cover 8 therefor, or supported rigidly in an extended position by means of a system of pivoted levers 9 that, in the present instance, and because of the length of the hood, constitute a lazy-tongs, the free end members having slot and pin connections 10 with the frame pieces. In the present instance the slots mentioned are formed in the hanger plates 7ᵃ of the frame, and the adjacent ends of the levers 9 pass between said plates and the frame proper.

To lock the lazy-tongs in extended position and support the hood for use, as shown in Fig. 2, there is fixed to one of the frames a yielding or resilient extension 11 which may be formed integrally with the hangers 7, as shown and which has slot 12 therein terminating in a communicating recess 13. A pin or projection 14, preferably formed by an extension of the intermediate pivot pin of the adjacent levers of the system, operates in the slot as the tongs and bellows are worked back and forth and the slot is arranged to extend angularly to the natural path of movement of the pin 14 so that, when the hood is fully extended, the pin will, by reason of the yielding character of the part 11, snap in to the recess 13 and lock the levers against return movement until sufficient downward pressure exerted by the operator upon the hood or tongs deflects the member 11 and releases the pin. As the slot 12 should preferably be as low down in the focusing well 2 as possible in order that the member 11, though long enough to cover the range of movement of the lever pivot, may not project unduly, the pivot pin 14 is preferably arranged upon an offset portion 15 on the levers. By these arrangements the hood is collapsed within the exceedingly limited compass shown by Fig. 3, an eyepiece 16 at the upper end of the hood being of a hinged and foldable character permitting it to be disposed in the extended position of Fig. 1 or the collapsed position of Fig. 3.

In its collapsed position, the hood and its supports, including the eyepiece, are readily accommodated within a relatively shallow focusing well and being of a unitary structure, distinct, in a way, from the body of the camera, the device of my invention can be assembled conveniently and then attached bodily to the camera at any stage of the latter's construction in the manner described.

I claim as my invention:

1. The combination with a focusing hood for cameras comprising relatively movable end portions and a collapsible intermediate portion, of a plurality of pivoted levers connecting said end portions to support them in separated positions and locking means for the levers comprising a relatively yielding slotted element and a coöperating pin on one of the levers and one of the end portions, respectively, said slotted element being provided with a recess communicating with the slot within which recess the pin is adapted to spring.

2. The combination with a focusing hood for cameras comprising relatively movable end portions and a collapsible intermediate portion, and a plurality of pivoted levers connecting said end portions to support them in separated positions, of a fixed but resilient element on one of the end portions having a slot therein inclined to the direction of relative movement of the parts, said slot being formed with a communicating recess and a pin carried with the levers in coöperation with the slot and adapted to automatically engage within the recess.

3. The combination with a focusing hood for cameras comprising relatively movable end portions and a collapsible intermediate portion, of a pair of levers movably connected with the end portions at their extremities and pivoted to each other at intermediate points to support the end portions in separated positions, a resilient element having a fixed position on one of the latter provided with a slot and with a recess communicating therewith and an extension on the pivot connecting the levers arranged to travel in the slot and engage the recess, the slot being inclined relatively to the path of movement of said pivot when the end portions are moved apart.

WILLIAM F. FOLMER.

Witnesses:
RUSSELL B. GRIFFITH,
NELSON COPP.